INVENTOR.
WILLEM J. HAGENDOORN

United States Patent Office 3,055,277
Patented Sept. 25, 1962

3,055,277
FILTER LOADING APPARATUS
Willem J. Hagendoorn, Louisville, Ky., assignor to American Air Filter Company, Inc., Louisville, Ky., a corporation of Delaware
Filed June 8, 1959, Ser. No. 818,606
4 Claims. (Cl. 93—84)

This invention relates to loading apparatus for loading filter media into filter supports and more particularly to an improvement in filter media loading apparatus of the type disclosed in Patent No. 2,238,251, issued April 15, 1941, and assigned to the assignee of the present invention by Verner Dahlman.

In Patent No. 2,238,251, a loader apparatus is disclosed that includes novel means for forming filter media to successive valleys of corrugated filter media supports as such supports move through the loading area, the loader apparatus of Patent No. 2,238,251 further including novel means for moving the supports through the loading area and independent means for holding the media in conformation with one valley while the media is being conformed to the next valley. In accordance with the present invention, an improved means for forming the filter media to the successive valleys of the media supports is provided, the present invention further providing an improved means for holding the media in conformation with one valley while the media is being conformed to the next valley. As a result of the improvements in filter media loading apparatus provided by the present invention, such apparatus now can be operated efficiently over longer periods of time with a minimum of wear and with even more efficient and accurate loading than has been known in the past.

Various other features of the present invention will become obvious to one skilled in the art upon reading the disclosure set forth hereinafter.

More particularly, the present invention provides a loading apparatus for loading filter media in conformation with the crests and valleys of corrugated filter supports comprising a frame through which corrugated filter media supports can pass with their crests and valleys extending sequentially in the line of motion, a carrier movably mounted on the frame, a blade means pivotally depending from the carrier in free swinging relation thereto, means for moving the carrier to direct the blade means downwardly into and upwardly out of a valley in the loading area for pressing interposed filter media into conformation with the valley, means to regulate the extremity of depth the blade means extends into a valley, and means to hold the filter media in conformed position in a valley in the loading area as the blade means passes upwardly out of a valley.

It is to be understood that various changes can be made in the arrangement, form and construction of the several parts of the apparatus disclosed herein without departing from the scope or spirit of the present invention.

Referring to the drawings which disclose an advantageous embodiment of the present invention:

Figure 1:
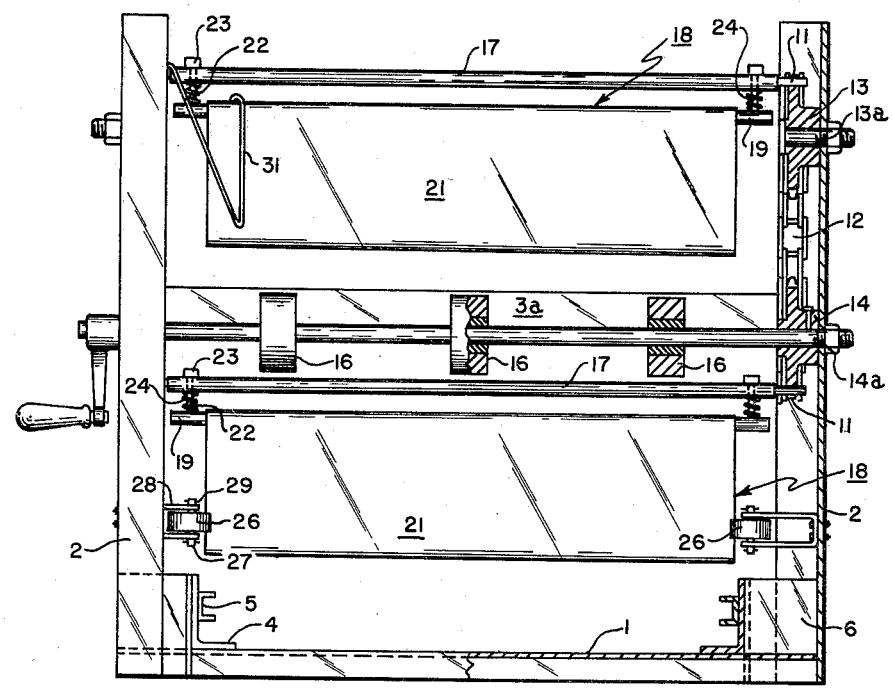
FIGURE 1 is a broken front elevational view of a loader embodying the present invention.
Figure 2:
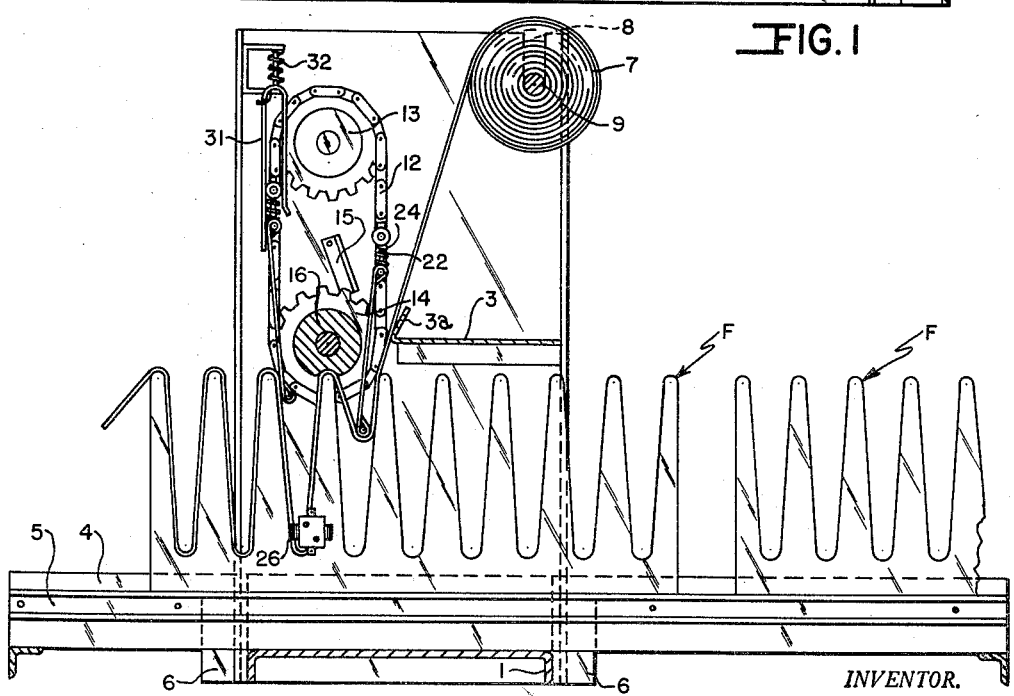
FIGURE 2 is a sectional view taken in a plane passing through line 2—2 of FIGURE 1.

As in abovementioned Patent No. 2,238,251, the present invention includes a frame having a loading area, a carrier movably mounted on the frame including a blade means depending therefrom and means to move the carrier so as to direct the blade means into loading operation with filter supports in the loading area of the frame.

The frame is composed of a horizontally arranged, downwardly facing, channel-shaped base member 1, and a pair of vertically arranged laterally spaced inwardly facing channel-shaped side members 2 at opposite ends of base member 1, all of these parts being welded or otherwise rigidly secured together. If desired, the frame can be reinforced by arranging a plate 3 horizontally between, and securing its opposite ends to the side walls 2 intermediate their upper and lower ends.

A frame-supported track, including a pair of laterally spaced angle-iron members 4, rests on base member 1 between and in generally parallel relation to side walls 2, each angle-iron member 4 being inwardly spaced from the adjacent side wall. Each angle-iron member carries on its inner vertical face spaced below its upper edge, a horizontally extending inwardly facing channel member 5. The top surface of each channel member 5 and the adjacent upwardly extending surface of angle-iron member 4 respectively provide a support and guide for corrugated filter media supports during their travel through the loading area. To add to the rigidity of the frame and track, a pair of L-shaped brackets 6 can be secured to the outer vertical face of each angle member 4 at opposite sides of base member 1. Each bracket 6 extends horizontally inward from the lower end of the corresponding side member 2 along one side of base member 1 to the angle-iron track member 4 and thence horizontally outward, from the base member 1, along the member 4 for a suitable distance. Bracket 6 can be welded or otherwise rigidly secured to all connecting parts.

The filter medium supports F, whose corrugated faces are covered by conforming sheets of filtering material are arranged on and moved along channel members 5 of track members 4 with their corrugated faces uppermost and with the crests and valleys of their corrugations extending sequentially in the line of motion. A roll of filtering material 7 can be removably supported on the frame in the usual way with the upper ends of the side-wall members 2 being notched as at 8 adjacent the rear of the loader to receive roll supporting member 9. To facilitate the feed of material from roll 7 to supports F around the front edge of reinforcing plate 3, the front marginal portion of plate 3 can be inclined upwardly and rearwardly as at 3a.

The carrier of the loading apparatus includes an upper idling sprocket 13 and a lower drive sprocket 14 mounted on each side member 2 of the abovedescribed frame.

Encircling each pair of idling and drive sprockets on each side member 2 is an endless conveyor chain 12. Each idling sprocket is rotationally supported on the adjacent side member 2 by individual stub shafts 13a while the lower drive sprockets are similarly supported by a common drive shaft 14a which projects through one wall to receive a suitable crank handle or other driving connection. One of the lower drive sprockets 14 is provided with a panel 15 pivotally mounted on adjacent side member 2 to permit rotation of chains 12 in one direction such as to make the front side of the carrier the upside thereof and to prevent rotation in the opposite direction.

Idly mounted on drive shaft 14a to rotate independently thereof and dimensioned to engage the crests of supports F successively as the crests pass thereunder are a number of resilient rollers 16, three being shown. As will be seen hereinafter, rollers 16 operate to clamp the filter media against a crest during the interval the media is being conformed to the valley immediately following such crests. The rollers can be held in spaced relation along drive shaft 14a by suitable cotter pins (not shown) passing through the shaft on each side of each roller.

It is to be noted that the frame and carrier apparatus so far described herein is substantially like that set forth in Patent No. 2,238,251 and, in itself, does not constitute the novel feature of the invention.

In accordance with the present invention, one or more blade support members 17, two being shown, are pivotally connected to the conveyor chains 12 by means of pintles 11 which are pivotally mounted on chains 12 to extend into opposite ends of blade support members 17. Loosely suspended in adjustable spaced relation from each blade support member 17 is a blade element 18. In this connection, it is to be noted that each blade element 18 includes a rod member 19 to which is looped body portion 21 of the blade element. Fastened to each rod member 19 by some suitable means such as welding, are spaced adjusting pins 22, these adjusting pins 22 have their free ends threaded. The free threaded ends of adjusting pins 22 pass loosely through bored holes in blade support member 17 and are held in position by nuts 23 fastened thereon. By turning nuts 23 on pins 22 it is possible to regulate the extremity of depth the body portion 21 of each blade element 18 can extend into a valley of a filter support and, in the event of wear of the pintles 11 or the blade element 18, it is only necessary to make an appropriate adjustment of nuts 23 on pins 22 to correct for such wear. It is further to be noted that encircling each of adjusting pins 22 between blade support members 17 and the blade elements 18 is a helical spring member 24. As will be seen more fully hereinafter, springs 24 permit blade elements 18 to yieldably press against the filter media as it is conformed to the valleys of the filter supports to further insure that the media snugly engages in such valleys at all times.

In accordance with another feature of the present invention, it has been recognized that as blade elements 18 are carried upwardly out of a valley of a filter support F, after having pressed media into conformity with such valley in the loading area, there is a tendency for the media to adhere to the blade elements 18 in their upward travel so as to be pulled away from the previously conformed position. To prevent the media from travelling along with the blade elements 18 the present invention provides a means to hold the media in conformed position. This means includes a pair of spaced resilient rollers 26. Each of rollers 26 is fastened to a shaft 27 rotatably journalled between the arms of a U-shaped bracket member 28. Suitable cotter pins 29 are provided to maintain shafts 27 in proper position. The base of each bracket member 28 in which a roller 26 is mounted is fastened to one of the side members 2 below a conveyor chain 12 substantially adjacent the position where the blade elements 18 presses the filter media into engagement with a valley of one of the filter supports F. The filter media is arranged to be slightly wider than the supports F to which it is conformed so that the edges of the media overlap the supports. The overlapped edges are engaged by resilient rollers 26 and the media is firmly held in place in the valley as blade element 18 passes upwardly therefrom.

In a typical operation of the apparatus described, filter media from roll 7 is passed downwardly around the underside of rollers 16 with the first crest of a filter support positioned under rollers 16 so that the media is pressed thereto in clamping relation by the rollers, the operation of the loader being instituted by the simple turning of the crank of drive shaft 14a to rotate the carrier. As the carrier moves, the body portion 21 of a blade element 18 passes downwardly along the downside of the carrier into engagement with the media and yieldably presses the media into conformation with the valley immediately following the first crest. During the latter phase of the operation the upper part of body portion 21 will engage support F immediately behind the first crest and, through such engagement, move the support forward as the blade element 18 moves around the lower sprockets. The completion of this forward movement brings the second crest of the support F in clamping relation underneath rollers 16 and the second valley in conforming relation underneath the downside of the endless conveyor chains of the carrier. At the same time, the pair of spaced rollers 26 mounted on the side members 2 are brought into clamping engagement with the overlapping sides of the filter media that has been conformed into the first valley by the body portion 21 of the first blade element 18. With continued movement of the carrier, the body portion 21 of the first blade element is carried upwardly out of the first valley while the body portion 21 of the other blade element 18 is carried downwardly into the second valley, the conforming, moving and clamping actions being repeated with each half turn of the carrier. It is to be noted that as the body portion 21 of blade element 18 is carried upwardly out of the valley, the rollers 26 hold the media that has been conformed to such valley firmly in place so that it does not adhere to the upwardly passing body portion and defeat the purposes of conformation.

It is desirable to limit the swinging action of the blade elements 18 during the interval in which they are disengaged from supports F to prevent a descending blade element from swinging over and catching on clamping rollers 16. Accordingly, swing-limiting means similar to that described in abovementioned Patent No. 2,238,251 are provided to engage the portion 21 of a blade element as it rises, move with it until it descends a suitable distance, and then return to its initial blade-rising position. Such means comprises an arm 31, pivotally mounted on one side member 2 for movement between blade-rising and descending positions and a spring 32 resiliently urging the arm to its blade-rising position. The outer end of the arm 31 is fastened to form an inverted U-shaped recess or saddle which, in the blade-rising position, extends directly in the path of the rising blade. Consequently, the blade, in rising, enters the saddle. In a manner comparable to that described in Patent No. 2,238,251, as blade element 18 crosses from the upside of the conveyor chain to the downside thereof, it swings the arm 31 horizontally from the rising position to the descending position against the action of spring 32. When blade element 18 moves downwardly out of the saddle of arm 31, spring 32 becomes effective to return arm 31 to the rising position. So long as the saddle of arm 31 straddles the blade element 18, the blade element cannot swing to an improper position; hence, upon descending, it is properly directed into a valley where it yielding presses the filter media into engagement with a support F.

The invention claimed is:

1. A loading apparatus for loading filter media in conformation with the crests and valleys of corrugated filter supports to form a unit filter assembly having treated media disposed therein comprising a frame through which corrugated filter media supports can pass with their crests and valleys extending sequentially in the line of motion, a carrier movably mounted on said frame, a blade support member pivotally connected to said carrier, a blade element adjustably and yieldably suspended at its extremities from said blade support member in spaced relationship thereto including resilient means interposed therebetween to permit the regulation of the extremity of depth said blade element can extend into a valley, and means for moving said carrier to direct said blade element downwardly into and upwardly out of a valley in said loading area for pressing interposed filter media into contact facing conformation with said valley.

2. A loading apparatus for loading filter media in conformation with the crests and valleys of corrugated filter supports to form a unit filter assembly having treated media disposed therein comprising a frame through which corrugated filter media supports can pass with their crests and valleys extending sequentially in the line of motion, a carrier movably mounted on said frame, a blade support member pivitally connected to said carrier, a blade element loosely suspended from said blade support member in free swinging relation to said carrier and in adjustable spaced relationship to said blade support member to permit the regulation of the extremity of depth said blade element can extend into a valley, resilient means between the extremities of said blade element and said blade support member to permit said blade element to yieldably press against said filter media, and means for moving said carrier to direct said blade element downwardly into and upwardly out of a valley in said loading area for pressing interposed filter media into contact facing conformation with said valley, said blade element resiliently yielding at the bottom of said valley in the event the adjusted stroke of said blade element extends beyond the depth of said valley.

3. A loading apparatus for loading filter media in conformation with the crests and valleys of corrugated filter supports to form a unit filter assembly having treated media disposed therein comprising a frame through which corrugated filter media supports can pass with their crests and valleys extending sequentially in the line of motion, a carrier movably mounted on said frame, a blade means pivotally and yieldably depending at its extremities from said carrier in free swinging relation thereto, means for moving said carrier to direct said blade means downwardly into and upwardly out of a valley in said loading area for pressing interposed filter media into conformation with said valley, and a pair of spaced resilient tension rollers mounted on the lower portion of said frame below said carrier so as to be adjacent the bottoms of the valleys of said supports to hold said filter media from adherence to said blade means and in conformed position in a valley in said loading area as said blade element passes upwardly out of a valley.

4. A loading apparatus for loading filter media in conformation with the crests and valleys of corrugated filter supports to form a unit filter assembly having treated media disposed therein comprising a frame having a loading area through which corrugated filter media supports pass with their crests and valley extending sequentially in the line of motion, a shaft mounted on said frame to extend across the line of motion slightly above the crests of said support, a pair of lower sprockets on said shaft at opposite sides of said loading area, a pair of upper sprockets mounted on said frame above said lower sprockets, a conveyor chain encircling each pair of sprockets, a blade support member pivotally connected to said chains, a blade element loosely suspended at its extremities from said blade support member in free swinging relation to said carrier and in adjustable spaced relationship to said blade support member to permit the regulation of the extremity of depth said blade element can extend within a valley, spaced spring means between said blade element ends and the ends of said blade support member to permit said blade element to yieldably press against said filter media, means for moving said chains to direct said blade element downwardly into and upwardly out of a valley in said loading area for pressing interposed filter media into facing contact conformation with said valley, said blade element resiliently yielding at the bottom of said valley in the event the adjusted stroke of said blade element extends beyond the depth of said valley, the upper end portion of said blade element pressing downwardly into and upwardly out of the upper portion of said valley during the conforming operation and, in doing so, being operative to engage and move said supports to position another valley thereof in the loading area, and a pair of spaced resilient tension rollers mounted on the lower portion of said frame below said pair of lower sprockets so as to be adjacent the valleys of said supports to hold said filter media in conformed position in a valley in said loading area as said blade element passes upwardly out of a valley.

References Cited in the file of this patent
UNITED STATES PATENTS

| | | |
|---|---|---|
| 1,000,991 | Comings | Aug. 22, 1911 |
| 2,188,572 | Hughes | Jan. 30, 1940 |
| 2,238,251 | Dahlman | Apr. 15, 1941 |
| 2,727,444 | Wethe | Dec. 20, 1955 |
| 2,834,263 | Goss | May 13, 1958 |